Figure 1:
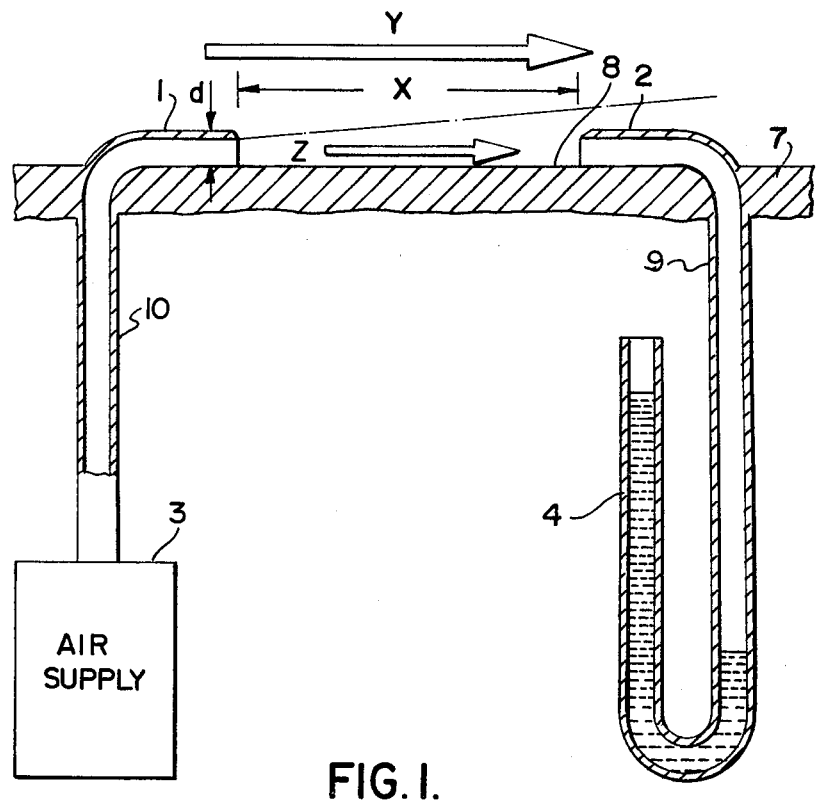

United States Patent [19]

Tanney

[11] 4,026,149
[45] May 31, 1977

[54] APPARATUS FOR MEASURING THE VELOCITY OF A FLUID

[75] Inventor: John W. Tanney, Ottawa, Canada

[73] Assignee: Canadian Patents and Development Limited, Ottawa, Canada

[22] Filed: Jan. 28, 1974

[21] Appl. No.: 437,758

Related U.S. Application Data

[63] Continuation-in-part of Ser. No. 835,084, June 20, 1969, abandoned, and a continuation-in-part of Ser. No. 222,269, Jan. 31, 1972, abandoned.

[52] U.S. Cl. ............................................. 73/194 R
[51] Int. Cl.² ........................................ G01W 1/00
[58] Field of Search ......... 73/194 R, 189; 137/803, 137/804

[56] References Cited

UNITED STATES PATENTS

| 3,686,937 | 8/1972 | Corey | 73/194 R |
| 3,705,534 | 12/1972 | Turek | 73/189 |

*Primary Examiner*—Jerry W. Myracle
*Attorney, Agent, or Firm*—Francis W. Lemon

[57] ABSTRACT

A fluid stream velocity measuring apparatus and its method of use wherein a fluid jet is directed from a nozzle along a portion of the flow path of a fluid stream whose velocity is to be measured, towards the open end of one or more receiver tubes. The nozzle and receiver tube or tubes are mounted by mounting means to have a jet forming space, extending between them a distance of at least five times the minimum distance across the nozzle orifice, with the fluid stream having a substantially unobstructed flow path along a surface of the mounting means extending past the nozzle and receiver tube or tubes. The fluid pressure in the receiver tube or tubes is measured to determine the velocity of the fluid stream into which the jet is directed. The internal geometry of the fluid jet nozzle is derived from the jet Reynolds number which is in excess of 1700 and the external geometry of the nozzle and/or receiver is defined to provide a substantially unobstructed flow path past the nozzle and receiver and substantially unrestrained interaction of the fluid stream with the jet.

4 Claims, 10 Drawing Figures

APPARATUS FOR MEASURING THE VELOCITY OF A FLUID

This application is a continuation-in-part of application Ser. No. 835,084, filed June 20, 1969, now abandoned, and continuation-in-part application thereof Ser. No. 222,269, filed Jan. 31, 1972, now abandoned.

This invention relates to an apparatus for measuring the velocity of a fluid stream relative to the apparatus.

There are many applications in which it is desirable to accurately measure the velocity of a fluid stream over a wide range of velocities. Present devices such as hot wires or hot film gauges and the pitot tubes suffer from having outputs that are not proportional to the measured velocity. Hot wires and films are delicate and require elaborate electronic equipment in their operations and the sensitivity of pitot tubes is dependent on the sensitivity of their associated pressure measuring apparatus, which generally limits their lower range of usefulness to 10 feet per second in air, except under specialized laboratory conditions. The use of rotating devices such as cup or propeller anemometers or their liquid counterparts provides an output proportional to the velocity of the measured stream but such instruments tend to stall at low velocities and their susceptibility or mechanical damage further limits their usefulness. Furthermore, such rotating devices, when designed to measure high fluid velocities, have very limited usefulness at low velocities and when designed to measure low velocities they are generally not useful or subject to damage at high velocities.

It is an object of the present invention to provide an apparatus for measuring the velocity of a fluid stream over a wider range of velocities than has been possible with known apparatus and to a greater accuracy than was possible with such apparatus.

It is a further object of the present invention to provide an apparatus, for measuring the velocity of a fluid stream, that is rugged and is substantially insensitive to its environment without being insensitive to the velocity of the fluid in such environment.

A further object of the present invention is to measure the direction in which a fluid stream is flowing by measuring the components of velocity of the fluid stream in a plane.

According to the present invention there is provided an apparatus for measuring the velocity of a fluid stream relative to the apparatus, comprising:

a. a fluid jet forming device having a fluid jet orifice, b. a pressurized fluid source connected to the device to deliver a fluid thereto and cause a jet of fluid to issue from the orifice along a portion of the flow path of the fluid stream, c. a receiver means including a receiver mouth facing the orifice, to be pressurized by the dynamic pressure of combined flows from the orifice and the fluid stream, within the area bounded by the receiver mouth, d. mounting means connecting the receiver means to the device to space them, along a portion of the flow path of the fluid stream, with the fluid stream having a substantially unobstructed flow path along a surface of the mounting means extending past the device and the receiver means, with the inlet end of the receiver mouth at a distance of at least five times the minimum distance across the orifice, from the outlet end of the orifice, and e. indicating means connected to the receiver means for indicating, in terms of the fluid pressure therein, the velocity of the fluid stream, and wherein, f. the geometry of the fluid jet orifice is derived from $$R = \frac{V h_n K}{\mu}$$

where, in consistent dimensions $R$ is the dimensionless Reynolds number and is in excess of 1700, $V$ is the velocity of the fluid issuing from the orifice, $K$ is the density of the fluid issuing from the orifice, $\mu$ is the viscosity of the fluid issuing from the orifice and, $h_n$ is the hydraulic diameter obtained from $$h_n = \frac{4 A_n}{P_n}$$

where, in consistent dimensions $A_n$ is the cross-sectional area of the fluid jet orifice at the outlet, and $P_n$ is the distance around the perimeter of the fluid jet orifice at the outlet, and g. when the device is to face downstream of the fluid stream it has an external geometry, exclusive of the surface of the mounting means, defined by its external perimeter enclosing a cross-sectional area less than $A_{on}$ between the limits of a plane located at the outlet of the fluid jet orifice and at a plane parallel thereto located $2h_n$ therefrom, where $h_n$ is the hydraulic radius previously defined, and $A_{on}$ is derived from $$A_{on} = \frac{\pi (2.2 h_n + Y_n)^2}{4},$$

where, in consistent dimensions, and within the limit of $Y_n$ is less than $2h_n$ $Y_n$ is the distance between the plane at the outlet of the fluid jet orifice of the device and the plane at which $A_{on}$ is to be defined, and when the receiver means is to face downstream of the fluid stream it has an external geometry, exclusive of the mounting means, defined by its external perimeter enclosing a cross-sectional area less than $A_{or}$ between the limits of a plane located at the inlet of the receiver mouth and a plane parallel thereto, by $$A_{or} = \frac{\pi (2.5 h_r + Y_r)^2}{4}$$

where, in consistent dimensions and within the limit of $Y_r$ is less than $2h_r$, $Y_r$ is the distance from the plane at the receiver mouth to the plane at which $A_{or}$ is to be defined, $h_r$ is the hydraulic diameter of the receiver mouth at its inlet as defined by the relationship $$h_r = \frac{4 A_r}{P_r},$$

where $A_r$ is the area enclosed by the receiver mouth at its inlet, and $P_r$ is the perimeter of the receiver mouth at its inlet.

Figure 2:
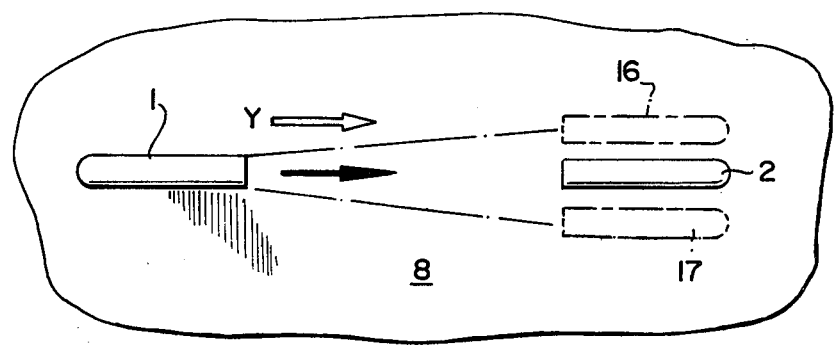
Figure 3:
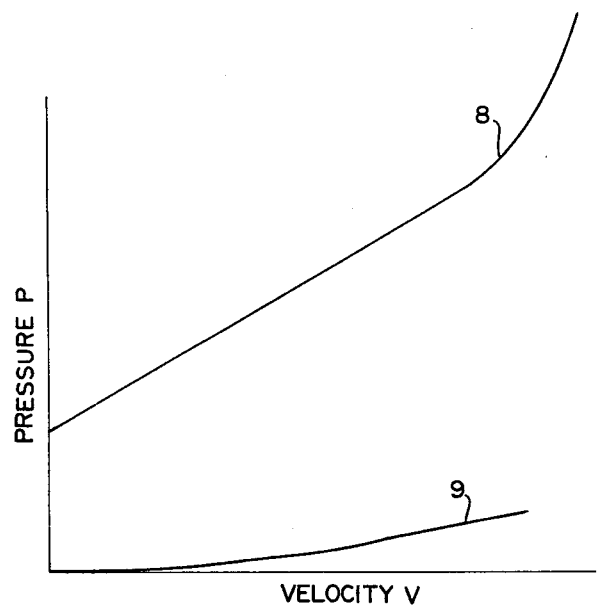
Figure 4:
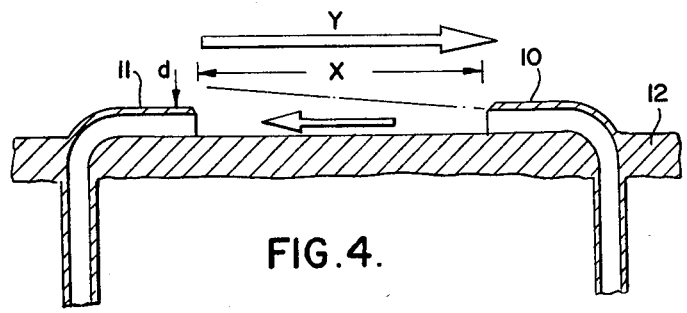
Figure 5:
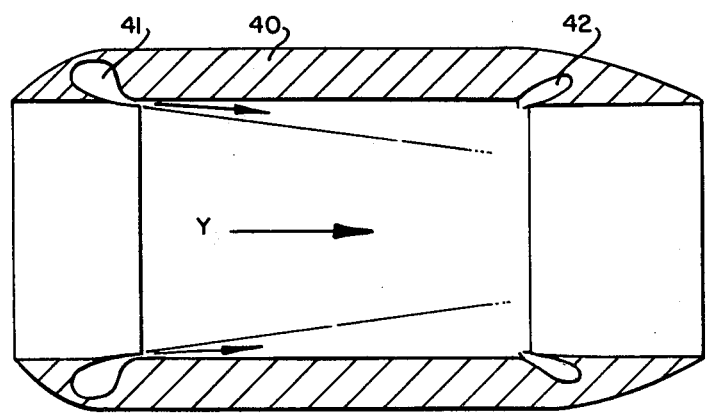
Figure 6:
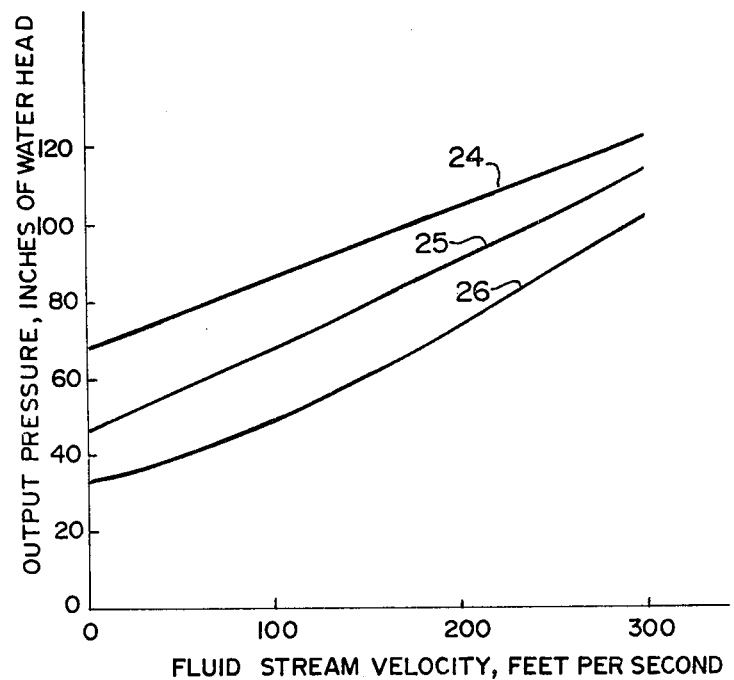
Figure 7:
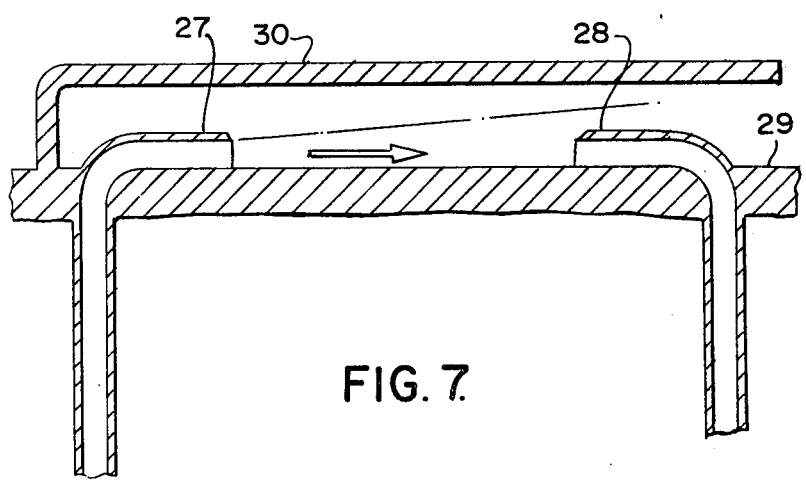
Figure 8:
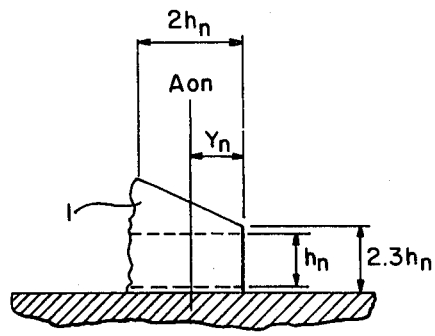
Figure 9:
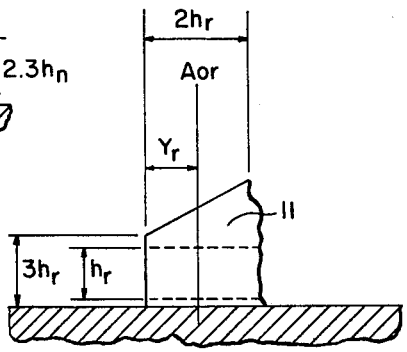
Figure 10:
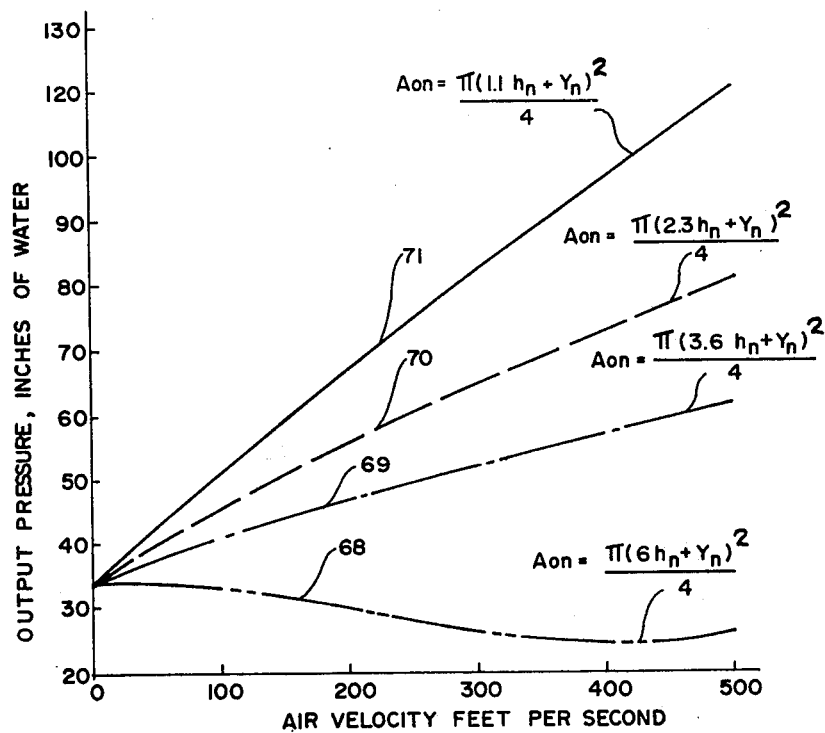

In the accompanying drawings which illustrate, by way of example, embodiments of the present invention, FIG. 1 is a diagrammatic sectional side view of an apparatus for measuring the velocity of a fluid stream, FIG. 2 is a plan view of FIG. 1, FIG. 3 is a graph of the fluid pressure in the receiver mouth, of the apparatus shown in FIG. 1 plotted against the velocity of a fluid stream and a similar graph for a pitot tube, FIG. 4 is a diagrammatic sectional side view of a similar jet forming device and receiver to that shown in FIG. 1 except that the jet forming device issues a jet in the opposite direction to the direction of flow of the fluid stream, FIG. 5 is a sectional side view of a fluid jet forming device for forming an annular jet, and a receiver means having an annular mouth, both mounted in a tube shaped shielding, Fig. 6 is a graph showing the fluid pressure in the receiver mouth of apparatus similar to that shown in FIG. 1, plotted against the velocity of a fluid stream, for different distances between the fluid jet forming device and the receiver mouth, FIG. 7 is a sectional side view of a comparator for use with the apparatus shown in FIGS. 1 to 4, FIG. 8 is a side view of a part of a circular jet forming device, and a portion of the mounting means shown sectioned, for use with the apparatus shown in FIG. 1, FIG. 9 is a side view of a circular receiver means, and a portion of the mounting means shown sectioned, for use with the apparatus shown in FIG. 1, and FIG. 10 is a graph illustrating the performance of the apparatus shown in FIG. 1 using various shaped nozzles.

In FIG. 1 there is shown a fluid jet forming device in the form of a nozzle 1, having a fluid jet orifice, a pressurized fluid source in the form of an air supply 3 connected by the tube 10 to the nozzle 1 to deliver a fluid thereto and cause a jet of fluid to issue from the orifice along a portion of a flow path of a fluid stream flowing in the direction of arrow Y. A receiver means in the form of a tube 2 including a receiver mouth facing the orifice of the nozzle 1 to be pressurized, by the dynamic pressure of combined flows from the orifice and the fluid stream flowing in the direction arrow Z, within the area bounded by the receiver mouth. Mounting means 7 connecting the tube 2 and the nozzle 1 to space them, along a portion of the flow path of the fluid stream, with the combined flows from the orifice and the fluid stream flowing in the direction of arrow Y having a substantially unobstructed flow path along and in contact with a surface 8 of the mounting means 7 extending past the nozzle 1 and tube 2, with the inlet end of tube 2 at a distance X of at least five times the minimum distance across the orifice of the nozzle 1. A manometer 4 is connected to the tube 2 by tube 9, and is an indicating means for indicating, in terms of the fluid pressure in the tube 2, the velocity of the fluid stream.

The tube 2 may be used to indicate the velocity of the fluid stream in a direction parallel with the jet from the nozzle 1. Two receiver tubes 16 and 17 may be used to measure the component of velocity at right angles to the jet from the nozzle 1 by sensing the differential pressure between the mouths of receivers 16 and 17. The receiver tubes 16 and 17 may be used to resolve the components of the flow "Y" in FIG. 2 that are parallel to the jet from the nozzle 1 and normal to such jet by measurement of differential and total dynamic pressures in the mouths of the receivers 16 and 17.

The geometry of the fluid jet orifice of the nozzle 1 is derived from $$R = Vh_n K/\mu$$

where in consistent dimensions $R$ is the dimensionless Reynolds number and is in excess of 1700, $V$ is the velocity of the fluid issuing from the orifice, $K$ is the density of the fluid issuing from the orifice, $\mu$ is the viscosity of the fluid issuing from the orifice, and $h_n$ is the hydraulic diameter obtained from $$h_n = 4A_n/P_n$$

where, in consistent dimensions, $A_n$ is the cross-sectional area of the fluid orifice at the outlet.

The velocity $V$ of said supply fluid at the outlet of the orifice of the nozzle 1 may be determined experimentally or may be derived, for a given geometry of the apparatus, pressure of the pressurized fluid source, and supply fluid, from published texts.

When the nozzle 1 faces downstream to the direction of the flow Y of the fluid stream the external geometry of the nozzle 1 is defined, to provide a substantially unobstructed flow past the fluid jet forming device and to allow substantially unrestrained interaction of the turbulent jet of fluid with the fluid stream, except along a surface of the mounting means, by its external perimeter, exclusive of the surface of the mounting means, in a plane parallel to the plane of the outlet orifice, enclosing an area less than $A_{on}$ between the limits of the plane of the outlet of the orifice and a parallel plane located two times $h_n$ from the plane of the outlet orifice, where $h_n$ is the hydraulic radius of the jet forming orifice, as previously defined $Y_n$ is the distance between the plane of the outlet orifice and the plane at which $A_{on}$ is determined, and $A_{on}$ is derived from $$A_{on} = \frac{\pi (2.2 h_n + Y_n)^2}{4}$$

In operation the apparatus was arranged as shown in FIG. 1, with the nozzle 1 and receiver 2 mounted in the fluid stream whose velocity is to be measured. The apparatus was arranged with a range of values for the distance "X", greater than the five times the minimum distance across the fluid jet orifice of the nozzle 1, which in this case was the diameter $d$. A jet of air was directed from the nozzle towards the receiver tube 2.

As stated, two further tubes 16 and 17 (shown dashed in FIG. 2) may be provided. The pressures P of the tubes 16 and 17, which are connected to manometers (not shown), will give an indication of the direction of the fluid stream relative to the longitudinal axis of the tubes 16 and 17. The tubes 16 and 17 may be used with or without the tube 2.

The surface 8 may be flat, or curved in a transverse and/or longitudinal direction to the direction of flow of the nozzle jet and direction Y of the fluid stream.

Readings of the air pressure P within the tube 2 were taken for different velocities V of the stream of air in the direction of arrow Y, and the results were plotted to obtain the graph 5, FIG. 3. Similar readings were taken using a Pitot tube and manometer and these were plotted to obtain the graph 6. It will be seen from FIG. 3 that the major part of the graph 5 indicated a linear relationship between the pressure in the tube 2 and the velocity of the air stream flowing in the direction of arrow Y. The graph 6 indicates a square law relationship between the pressure obtained from a Pitot tube and manometer and the velocity or air stream to be measured. Thus the apparatus shown in FIGS. 1 and 2 has considerable advantage in terms of sensitivity and linearity when compared with a Pitot tube.

In FIG. 4 there is shown a nozzle 10, a receiver 11, and a surface 12 of an apparatus similar to the apparatus shown in FIG. 1 except the nozzle 10 is disposed to emit a fluid jet in the opposite direction to the flow Y of the fluid stream, that is, the mouth of the tube 11 forming the receiver means faces downstream of the fluid stream flowing in the direction of the arrow Y. This arrangement has also been shown to provide a suitable apparatus for measuring the velocity of a fluid stream.

In this embodiment the geometry of the fluid jet orifice is also defined in terms of the Reynolds number R being in excess of 1700 by the relationship $$R = Vh_n K/\mu, \text{ and}$$

in accordance with the nomenclature previously defined in this specification.

The external geometry of the receiver means with the mouth of the tube 11 facing downstream of the fluid stream flowing in the direction of the arrow Y is defined to provide a substantially unobstructed flow path past the tube 11 and to allow substantially unrestrained interaction of the turbulent jet of fluid with the fluid stream, except along the surface of the mounting means 12, by being such that the maximum area enclosed by the outer perimeter of the receiver means 11, exclusive of the surface of the mounting means 12, in a plane parallel to the plane of the receiver mouth is less than $A_{or}$ as defined by the relationship $$A_{or} = \frac{\pi (2.5 h_r + Y_r)^2}{4}$$

where, within the limit of $Y_r$ being less than $2 h_r$
$Y_r$ is the distance from the plane of the receiver mouth to the plane at which $A_{or}$ is determined.
$h_r$ is the hydraulic diameter of the receiver mouth at its inlet as defined by the relationship
$h_r = 4 A_r/P_r$ where,
$A_r$ is the area enclosed by the receiver mouth at its inlet, and
$P_r$ is the perimeter of the receiver mouth at its inlet.

The nozzle 10 is disposed to emit a turbulent fluid jet in a direction opposite to the direction of the flow Y of the fluid stream. Incremental increases in the velocity of the fluid stream produces a decrease in the pressure in the receiver 11.

In FIG. 5 there is shown a cylindrical casing 40, having an annular-shaped nozzle orifice 41 and an annular-shaped receiver mouth 42.

In this embodiment at least a portion of the fluid stream, whose velocity is to be measured, passes down the center of the annular-shaped jet issuing from the nozzle orifice 41, and through the central opening of the annular-shaped receiver mouth 42. This embodiment also reduces changes in the pressure in the receiver mouth with respect to the measured velocity when the cylindrical casing 40 is unintentionally placed so that the annular-shaped jet issuing from the nozzle is inadvertently directed along a sloping path to the direction of the stream of air whose velocity is to be measured.

In the embodiment shown in FIG. 5, one or both of the nozzle and receiver may be segmented to facilitate construction of the apparatus and the cylindrical casing 40 may be a portion of a pipe or tube.

In FIG. 6 an apparatus similar to that shown in FIG. 1 was used for different lengths of X. The nozzle orifice was 0.007 inches, measured in a plane normal to the surface 5 and 1.5 inches measured in a plane parallel to the plane 5. The receiver mouth of 0.028 inch diameter was circular and tangetial to the surface 8. The output pressure in the receiver mouth and the tube 9 as measured by the manometer 4 was recorded in inches of water for different velocities of the air stream in the direction of the arrow Y, in feet per second. The air supply pressure from the air supply 3 was 40 P.S.O.G. For the various graphs shown in FIG. 6, for 24, $x = 1.75$ inches, for 25 $x = 2.75$ inches, for 26 $x = 3.75$ inches. It will be appreciated that with different proportions of experimental apparatus, and different experimental conditions, different graphs may be obtained.

In FIG. 7 there is shown a comparator comprising a jet forming device 27 having a fluid jet orifice, and a receiver means 28 having a receiver mouth. The device 27 and receiver means are disposed on a surface 29 within a shield means 30 to cause a jet from the orifice to flow along the surface 28, and within the fluid contained in the shield 30, in a manner similar to that described with reference to FIGS. 1 and 2.

With the apparatus described with reference to FIGS. 1 to 5 a biased output pressure from the receiver means is obtained, that is, the output pressure is not zero with no fluid stream flowing. This bias is primarily a function of air flow from the nozzle orifice and the distance x (FIG. 1). With the comparator shown in FIG. 7 the output is unaffected by the fluid stream as the interaction of the jet with the fluid stream is restrained by the shield 30.

The apparatus shown in FIG. 7 provides a comparator for the apparatus described with reference to FIGS. 1 to 4 wherein its output pressure is substantially unaffected by the fluid stream whose velocity is measured. Thus comparing the output pressure of the apparatus illustrated in FIG. 7 with the output of apparatus shown in anyone of FIGS. 1 to 4, with both apparatus coupled to the same air supply 3 (FIG. 1) will provide a compensation for changes in the air supply 3. In this sense the nozzle 27 is a second nozzle and the receiver 28 is a second receiver. In other embodiments a different shield 30 means may be used, for example a screen or perforated sheet metal shield.

FIG. 8 illustrates the limitation of the external geometry of the nozzle 1 with respect to FIG. 1 and other embodiments of the invention in which the fluid stream is flowing in substantially the same direction as the jet from the nozzle orifice. The outline of the nozzle 1 shown in FIG. 8 illustrates a nozzle 1 with a circular jet orifice and external geometry, exclusive of the mounting surface, defined in accordance with the relationship $$A_{en} = \frac{\pi (2.2 h_n + Y_n)^2}{4}$$

where the nomenclature is as previously defined. The shape of the external surface of the nozzle 1 would be somewhat different from the same relationship with a different shaped orifice, such as oval, square or rectangular shape.

FIG. 9 illustrates the limitation of the external geometry of the receiver 11 with respect to FIG. 4 and other embodiments of the invention in which the fluid stream is flowing in substantially the opposite direction to the jet from the nozzle orifice. The outline of the receiver 11 shown in FIG. 9 illustrates a receiver with a circular mouth and external geometry defined in accordance with the relationship $$A_{er} = \frac{\pi (2.5 h_r + Y_r)^2}{4}$$

where the nomenclature is as has been previously defined. The shape of the external surface of the receiver 11 would be somewhat different for the same relationship with a different shaped mouth such as oval, square or rectangular shape.

FIG. 10 illustrates the performance of various nozzles ranging from one that exceeds the limits of dimensions specified with reference to FIGS. 1 to 5 to one that falls fully within such limits. For the various graphs shown in FIG. 10, for 68 the nozzle was a flat-ended tube; going through 69 and 70 for tapering nozzles to 71 for a sharpened nozzle, to verify the limits defined with reference to FIGS. 1 to 4. The use of a nozzle having an external geometry outside of such defined limits provides an output pressure sensitivity that is not linear with velocity of the fluid stream, is ambiguous, and is such that the apparatus is not useful for the measurement of the velocity of a fluid stream. The external geometry of the receiver, when facing downstream of the fluid strea, was similarly verified.

In a further embodiment of the invention wherein the fluid stream, whose velocity is to be measured, may flow substantially in the direction shown in FIG. 1 or substantially in the direction shown in FIG. 4, a nozzle 1 as described with reference to FIG. 1 is used, and a receiver 11 as described with reference to FIG. 4 is used, both defined by the relationships and nomenclature previously stated.

In this specification the fluid from the pressurized fluid source and the fluid stream may be either liquid or gaseous or mixtures of any two or more of liquids, gases and solids.

Further in this specification the fluid stream is a flow of fluid in a bounded or an essentially unbounded volume except for one side, which is moved by a propelling means such as a pump, fan or similar device or by natural forces such as are present in the atmosphere or the oceans. Further, such fluid stream may be the velocity of the fluid relative to various embodiments are moved through a stationary or moving fluid by a transporting device such as a tracked or free vehicle. Such vehicle could be a mechanical drive to move the embodiment through a tank of fluid, an automotive vehicle, a ship, a submarine, or an aeroplane.

In this specification the phrase "to cause a jet of fluid to issue from said orifice along a portion of the flow path of said fluid stream" is intended to include:
1. the case where the jet and fluid stream are along the same axis and flow in the same direction.
2. The case where the jet and fluid stream are along the same axis and flow in the opposite direction.
3. The case where the jet and fluid stream are along paths which slope with respect to one another and cross and flow in the same direction, and
4. The case where the jet and fluid stream are along paths which slope with respect to one another and cross and flow in opposite direction.

In all of the embodiments described above it was found that the apparatus was unreliable if the inlet end of the receiver mouth was at a distance of less than five times the minimum distance across the nozzle orifice, from the outlet end of the nozzle orifice.

Changes in the fluid pressure in the receiver may be interpreted by changes in fluid flow in the receiver instead of by, or in combination with, actual changes of fluid pressure within the receiver.

It will be appreciated that all of the embodiments of the invention described with reference to FIGS. 1 to 10 may, if desired, have the fluid jet forming device and the receiver means mounted to be movable relative to one another to adjust the distance between the outlet end of the orifice and the inlet end of the receiver means to a desired setting.

I claim:
1. Apparatus for measuring the velocity of a fluid stream relative to the apparatus, comprising:
   a. a fluid jet forming device having a fluid jet orifice,
   b. a pressurized fluid source connected to the device to deliver a fluid thereto and cause a jet of fluid to issue from the orifice along a portion of the flow path of the fluid stream, and combine therewith to form a combined flow,
   c. a receiver means including a receiver mouth facing the orifice, to be pressurized by the dynamic pressure of said combined flows from the orifice and the fluid stream, within the area bounded by the receiver mouth jet,
   d. mounting means connecting the receiver means to the device to space them, along said portion of the flow path of the fluid stream, with said combined flows having a substantially unobstructed flow path along and in contact with a surface of the mounting means extending past the device and the receiver means, with the inlet end of the receiver mouth at a distance of at least five times the minimum distance across the orifice, from the outlet end of the orifice, and
   e. indicating means connected to the receiver means for indicating, in terms of the fluid pressure therein, the velocity of the fluid stream, and wherein,
   f. the geometry of the fluid jet orifice is derived from

$$R = \frac{V h_n K}{\mu}$$

where, in consistent dimensions
$R$ is the dimensionless Reynolds number and is in excess of 1700,
$V$ is the velocity of the fluid issuing from the orifice, $K$ is the density of the fluid issuing from the orifice, $\mu$ is the viscosity of the fluid issuing from the orifice, and $h_n$ is the hydraulic diameter obtained from $$h_n = \frac{4A_n}{P_n}$$

where, in consistent dimensions, $A_n$ is the cross-sectional area of the fluid jet orifice at the outlet, and $P_n$ is the distance around the perimeter of the fluid jet orifice at the outlet, and g. when the device is to face downstream of the fluid stream it has an external geometry, exclusive of the surface of the mounting means, defined by its external perimeter enclosing a cross-sectional area less than $A_{on}$ between the limits of a plane located at the outlet of the fluid jet orifice and at a plane parallel thereto located $2 h_n$ therefrom, where $h_n$ is the hydraulic radius previously defined, and $A_{on}$ is derived from $$A_{on} = \frac{\pi (2.2h_n + Y_n)^2}{4},$$

where, in consistent dimensions and within the limit of $Y_n$ is less than $2h_n$ $Y_n$ is the distance between the plane at the outlet of the fluid jet orifice of the device and the plane at which $A_{on}$ is to be defined, and when the receiver means is to face downstream of the fluid stream it has an external geometry, exclusive of the mounting means, defined by its external perimeter enclosing a cross-sectional area less than $A_{or}$ between the limits of a plane located at the inlet of the receiver mouth and a plane parallel thereto, by $$A_{or} = \frac{\pi (2.5h_r + Y_r)^2}{4},$$

where, in consistent dimensions and within the limit of $Y_r$ is less than $2 h_r$, $Y_r$ is the distance from the plane at the receiver mouth to the plane at which $A_{or}$ is to be defined, $h_r$ is the hydraulic radius of the receiver mouth at its inlet as defined by the relationship $$h_r = \frac{4A_r}{P_r},$$

where $A_r$ is the area enclosed by the receiver mouth at its inlet, and $P_r$ is the perimeter of the receiver mouth at its inlet.

2. Apparatus according to claim 1, wherein the fluid jet forming device has an annular-shaped fluid jet orifice for producing an annular jet of fluid around at least a portion of the fluid stream, the receiver means has an annular-shaped receiver mouth, facing the fluid jet orifice, and a central opening, within the annular-shaped receiver mouth for passage of fluid stream within the annular jet.

3. Apparatus according to claim 1, wherein the fluid jet forming device is a nozzle having an orifice of circular cross-section, the receiver means is an open ended tube, and the nozzle and tube are both mounted on a surface of the mounting means.

4. Apparatus according to claim 3, wherein the receiver means is a first receiver means, and at least one further receiver means is provided, each of the receiver means is an open ended tube, and the receiver means are mounted on the surface, to measure the pressures therein in the longitudinal direction of flow of the fluid stream and transverse thereto as an indication of the direction of the fluid stream relative to the longitudinal axis of nozzle.

* * * * *

UNITED STATES PATENT OFFICE
CERTIFICATE OF CORRECTION

Patent No. 4,026,149          Dated May 31, 1977

Inventor(s) John W. Tanney

It is certified that error appears in the above-identified patent and that said Letters Patent are hereby corrected as shown below:

The term of this patent subsequent to January 31, 1992 has been disclaimed.

Signed and Sealed this nineteenth Day of July 1977

[SEAL]

Attest:

RUTH C. MASON
*Attesting Officer*

C. MARSHALL DANN
*Commissioner of Patents and Trademarks*